March 9, 1937.  R. A. SOPP  2,073,500
PISTON RING
Filed Dec. 13, 1933
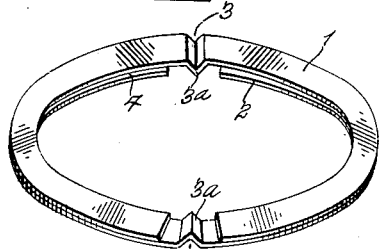
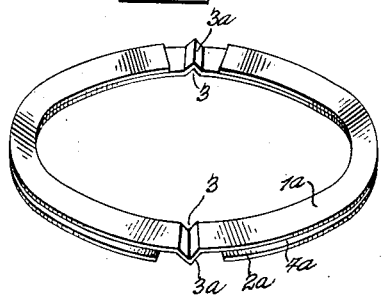
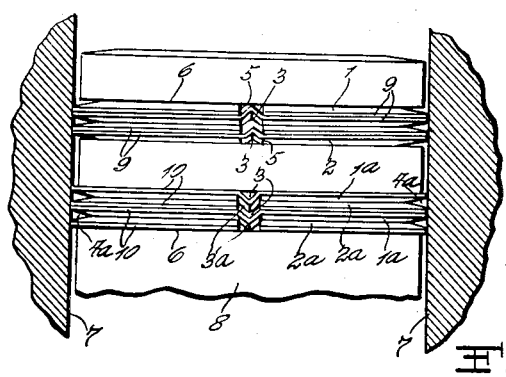
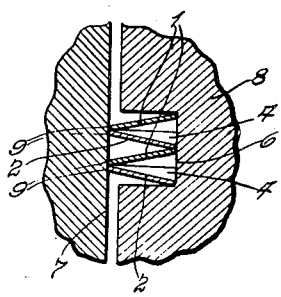
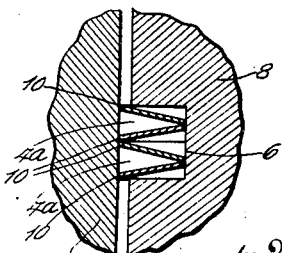
Inventor
Richard A. Sopp Patented Mar. 9, 1937

2,073,500

UNITED STATES PATENT OFFICE 2,073,500

PISTON RING

Richard A. Sopp, St. Louis, Mo., assignor to Surety Products Company, St. Louis, Mo., a corporation of Missouri Application December 13, 1933, Serial No. 702,224

3 Claims. (Cl. 309—24)

The invention relates to improvements in the coiled steel type of piston ring and packing ring, in which an offset step, corrugation or notch is formed across the face of each ring segment; and the objects of the improvement are, first, to prevent lateral creeping, or turning of the ring segments, second, to control the peripheral or circumferential tension of the ring segments against the cylinder walls, third, to control the means of the compression seal of the ring; fourth, to retain greater flexibility of the material in the ring; and fifth, to add additional strength in the segment faces for resistance to compressed circumferential tension. These improvements are made through the use of the offset step, corrugation or notch above mentioned.

One form of the invention is illustrated in the accompanying drawing, in which Fig. 1 is a perspective view of the piston ring or packing ring with a groove formed between the segment faces on the inside diameter of the ring, Fig. 2 is a perspective view of the piston ring or packing ring with a groove formed between the segment faces on the outside diameter of the ring, Fig. 3 is a cross-sectional view of a cylinder and piston head section with the two styles of piston ring and packing ring in working position, Fig. 4 is an enlarged view of a cross-sectional cut of the ring groove in the piston head showing the position of the piston ring shown in Fig. 1, and Fig. 5 is an enlarged view of a cross-sectional cut of the ring groove in the piston head showing the position of the piston ring shown in Fig. 2.

The piston ring or packing ring, Fig. 1, may be composed of two or more segments of coiled, flat, tempered or untempered steel 1 and 2, with an offset step, corrugation or notch 3, 3a, formed across the concave side or face of each segment, which concave side or face is the natural result of the coiling process of the material, equal distance between the segment ends, so that when compressed the ends will bear against the offset step, corrugation or notch. The result of placing these two segments together as shown forms an opening 4 between the ring faces on the inside diameter. The piston ring or packing ring shown in Fig. 2 is identical in construction as that shown in Fig. 1, with the difference, that the offset step, corrugation or notch 3, 3a, is formed on the reverse or convex faces of the segments as shown at 1a and 2a, thereby causing an opening 4a to be formed on the outside diameter of the piston ring or packing ring.

Fig. 3 is a cross-sectional view of a cylinder wall 7, and piston head 8, with two ring grooves 6, with the upper groove containing two piston rings or packing rings of the type shown in Fig. 1, composed of four ring segments 1 and 2, placed together in compressed position so that the segment ends 5 bear against the offset step, corrugation or notch 3, 3a, of the companion segment, completing a sealed compression surface against the cylinder wall.

The offset step, corrugation or notches 3a, and the grooves 3, shown in Figs. 1, 2 and 3, are grossly exaggerated views of the true shape and are drawn thus to give the clear impressions of the main objects of the invention.

Fig. 4 is an enlarged cross-sectional view of the upper piston head groove 6, cylinder wall 7, and piston head 8, with the four ring segments 1, and 2 showing the seating arrangement of the piston rings as shown in the upper ring groove of Fig. 3 formed with the offset step or notch on the concave side of each segment 1 and 2, presenting two surfaces formed by the outside edges 9 of the piston segments, with the resulting openings 4 between the ring segments formed toward the inside diameter of the piston rings.

Fig. 5 is an enlarged cross-sectional view of the lower piston head groove 6, cylinder wall 7, and piston head 8, with the four ring segments 1 and 2 showing the seating arrangement of the piston rings as shown in the lower ring groove of Fig. 3 formed with the offset step, corrugation or notch on the convex side of each ring segment, presenting three ring surfaces 10 toward the cylinder wall, with the resulting openings between the ring segments 4a formed toward the outside diameter of the piston ring.

The objects of Figs. 3, 4 and 5, are to show the peripheral or circumferential tensions and the vertical tensions of the piston ring segments of each type of piston ring or packing ring described in Figs. 1 and 2, respectively, when compressed in working position within the cylinder walls, with their various compression seals and lubrication controls.

I am aware that prior to my invention, coiled steel piston rings have been made from rolled steel material. I therefore do not claim the origin of this type of piston ring or packing ring broadly; but

I claim:

1. A piston ring comprising a plurality of truncated conical split steel rings having their outer edges on approximately uniform radii of curvature and each of which is of less circumferential length than a complete annulus and is of approximately uniform thickness throughout its circumference and is convex on one side and concave on the other, each of said rings being on one side of an adjacent ring throughout its circumference and having its outer edge contacting with the outer edge of said adjacent ring whereby the walls of said rings diverge inwardly relative to one another, and a laterally extended portion on each ring having about the same thickness as the remainder of the ring and extending between the ends of the adjacent ring.

2. A piston ring of the character described comprising a plurality of truncated conical split steel rings each of which is of less circumferential length than a complete annulus and is of approximately uniform thickness, each of said rings being located on one side of an adjacent ring throughout its circumference, said rings having their walls diverging from each other, and a laterally bent portion on each ring having about the same thickness as the remainder of the ring and extending between the ends of one of the adjacent rings.

3. A packing device of the character described comprising a plurality of truncated conical split steel rings of approximately uniform thickness and of less circumferential length than a complete annulus and each of which is convex on one side and concave on the other, each of said rings being located on one side of an adjacent ring in a relationship in which the outer edge of each ring contacts with the outer edge of an adjacent ring, and said rings having their ends spaced circumferentially, and a laterally bent portion in connection with each ring having about the same thickness as the remainder of the ring and extending between the ends of an adjacent ring.

RICHARD A. SOPP.